United States Patent [19]

Pimpis et al.

[11] Patent Number: 4,947,149
[45] Date of Patent: Aug. 7, 1990

[54] ELECTRICAL FUSE WITH IMPROVED CASING

[75] Inventors: Robert M. Pimpis, Dover; Richard T. Oakes, South Hampton, both of N.H.; Michael D. Ellery, Newburyport, Mass.; Edward J. Knapp, Jr., Stratham, N.H.

[73] Assignee: Gould, Inc., East Lake, Ohio

[21] Appl. No.: 413,453

[22] Filed: Sep. 27, 1989

[51] Int. Cl.⁵ .................... H01H 85/14; H01H 85/38
[52] U.S. Cl. ........................ 337/246; 337/273
[58] Field of Search .............. 337/246, 273; 428/36.1, 428/36.3

[56] References Cited

U.S. PATENT DOCUMENTS

| | | |
|---|---|---|
| Re. 13,568 | 5/1913 | Cobb . |
| 1,110,671 | 9/1914 | Cobb . |
| 1,895,022 | 12/1930 | Chandler . |
| 2,025,038 | 12/1935 | Cannon . |
| 2,298,748 | 10/1942 | Brown . |
| 2,344,181 | 3/1944 | Stone . |
| 2,870,295 | 1/1959 | Haroldson et al. .................. 337/246 |
| 3,007,497 | 11/1961 | Shobert . |
| 3,033,729 | 5/1962 | Shobert . |
| 3,111,567 | 11/1963 | Stewart et al. ...................... 337/246 |
| 3,240,905 | 3/1966 | Kozacka . |
| 3,424,204 | 1/1969 | Sato . |
| 3,979,709 | 9/1976 | Healey, Jr. . |
| 3,983,525 | 9/1976 | Healey, Jr. . |
| 3,984,800 | 10/1976 | Healey, Jr. . |
| 4,104,604 | 8/1978 | George . |
| 4,124,836 | 11/1978 | Wilks . |
| 4,215,331 | 7/1980 | Kozacka . |
| 4,216,457 | 8/1980 | Panaro . |
| 4,300,281 | 11/1981 | Panaro . |
| 4,344,808 | 8/1982 | Healey, Jr. et al. . |
| 4,349,803 | 9/1982 | Tobin . |
| 4,373,555 | 2/1983 | Mattuck et al. . |
| 4,373,556 | 2/1983 | Bergh . |
| 4,713,645 | 12/1987 | Razavi . |
| 4,808,963 | 2/1989 | Stunzi et al. . |

*Primary Examiner*—H. Broome
*Attorney, Agent, or Firm*—Fish & Richardson

[57] ABSTRACT

An electrical fuse including a fuse casing having a tubular wall including multiple-filament reinforcing yarns that have been braided in the tubular shape of the wall and a synthetic resin bonding the yarns together and impregnating the yarns, a pair of terminals secured to the ends of the fuse casing, and a fusible element inside the casing and connected to the terminals.

27 Claims, 1 Drawing Sheet

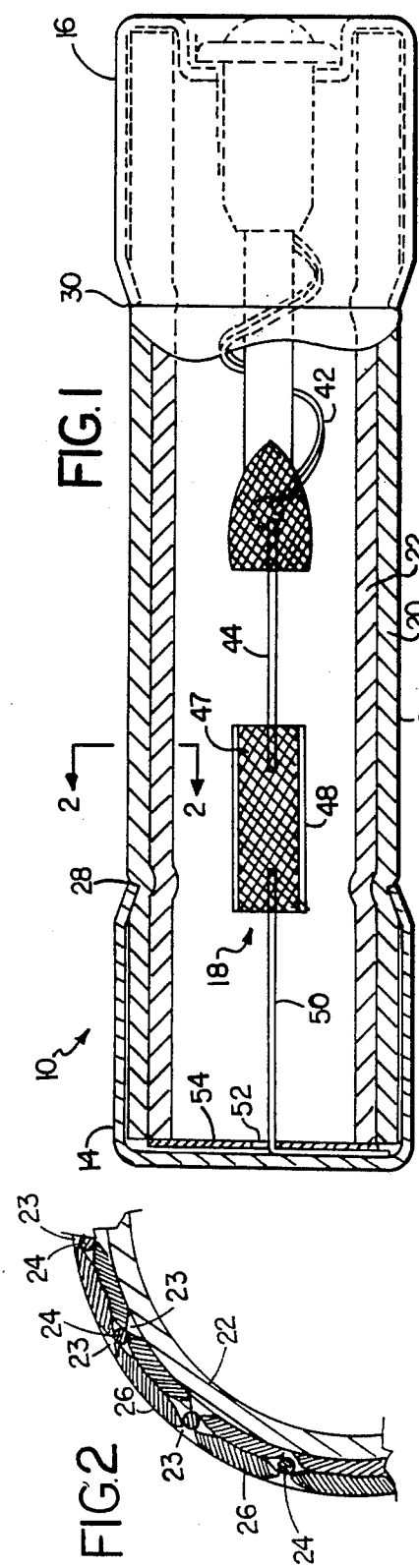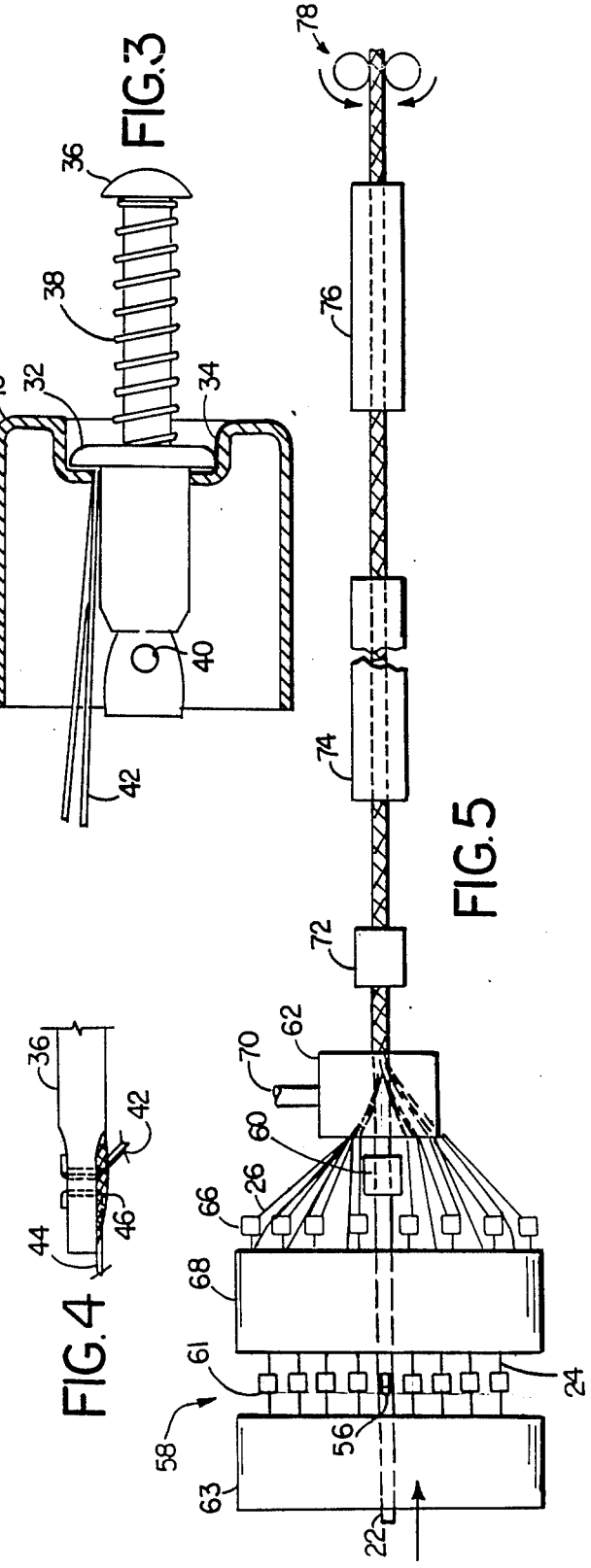

ELECTRICAL FUSE WITH IMPROVED CASING

BACKGROUND OF THE INVENTION

The invention relates to electrical fuses employing tubular fuse casings.

Electrical fuses are used to conduct current under normal conditions and to break a circuit under overload conditions by the melting of fusible elements of the fuses. In some fuses, tubular fuse casings are used to contain the fusible elements The ends of the fuse casings are sealed shut by crimped ferrules to which the fusible elements are electrically connected. The fuse casings must be resistant to the axial and radial mechanical stresses and to thermal stresses experienced during blowing of the fuse. The fuse casings must also exhibit dimensional stability so as to maintain good contact with the crimped ferrules during use. The casing should ideally be a good thermal insulator in order to contain the heat and provide for quick melting of the fusible elements under overload conditions.

Healey, Jr., U.S. Pat. Nos. 3,979,709; 3,983,525; and 3,984,800 disclose fuses employing fuse casings made by wrapping a plurality of fabric and fiber mat plies on stationary tubular mandrels that have holes for injecting and impregnating resin into the plies. Kozacka U.S. Pat. No. 3,240,905 and Wilks U.S. Pat. No. 4,124,836 disclose fuses having fuse casings with outer tubes and asbestos liners inside.

SUMMARY OF THE INVENTION

In one aspect, the invention features, in general, an electrical fuse that includes a fuse casing with a preformed inner structural tube and an outer layer that has been formed in place thereon.

In preferred embodiments, the outer layer includes reinforcing fibers around the inner tube and resin bonding the fibers together; the reinforcing fibers are multiple-filament reinforcing yarns that have been braided in a tubular shape on the inner tube, and the resin impregnates the yarns. The preformed inner tube provides thermal barrier properties, and in addition can be used to provide bulk to the inner tube inexpensively without the need for additional layers of reinforcing fiber. The inner tube is made of paper that is an electrical insulation grade of vulcanized fiber (sometimes referred to as fish paper). The braided yarns include longitudinally oriented warp yarns and laterally oriented fill yarns. The resin is a thermoset resin preferably made of polyester, phenolic, epoxy or melamine. The casing has a circular or a square cross section. The yarns preferably are fiberglass; depending on the application, other material such as Kevlar or graphite can be used. The fill yarns are more than 4 times larger than the warp yarns (most preferably 8 to 10 times larger than the warp yarns), and there are twice as many fill yarns as warp yarns.

In another aspect, the invention features, in general, a method of making an electrical fuse by providing a preformed inner tube, forming an outer layer thereon (most preferably by braiding on the tube), placing a fusible element inside the inner tube, and electrically connecting ferrules to the fusible elements and securing the ferrules to the respective ends of the casing.

In another aspect, the invention features, in general, an electrical fuse that includes a fuse casing having a tubular wall that includes multiple-filament reinforcing yarns that have been braided in the tubular shape of the wall and a synthetic resin that bonds the yarns together and impregnates the yarns.

Other features and advantages of the invention will be apparent from the following description of the preferred embodiment thereof and from the claims.

DESCRIPTION OF PREFERRED EMBODIMENTS

The preferred embodiments will now be described.

DRAWINGS

FIG. 1 is an elevation, partially broken away, of an electrical fuse according to the invention.

FIG. 2 is a sectional view, taken at 2—2 of FIG. 1, showing the fuse casing wall of the FIG. 1 electrical fuse.

FIG. 3 is a vertical sectional view showing a ferrule end cap and associated components thereof.

FIG. 4 is a partial plan view of some components of a fusible element assembly of the FIG. 1 electrical fuse.

FIG. 5 is a diagram showing a manufacturing process for making the fuse casing of the FIG. 1 electrical fuse.

STRUCTURE, MANUFACTURE AND OPERATION

Referring to FIGS. 1–4, there is shown electrical fuse 10 including tubular fuse casing 12, ferrules 14 and 16 and a fusible element assembly 18. Fuse casing 12 has outer layer 20 and a preformed inner structural paper tube 22. Outer layer 20 has a tubular wall structure including multiple-filament reinforcing yarns that have been braided in a tubular shape on inner tube 22 and a polyester resin 23 that bonds the yarns together and impregnates the yarns. The yarns of outer layer 20 include sixteen longitudinally oriented, fiberglass warp yarns 24 (available under the ECG 75 1/0–0.7 TPI designation from Owens Corning) and thirty-two fiberglass fill yarns 26 (available under the ECG 37 1/0–0.7 TPI 4 ends designation from Owens Corning). Inner tube 22 is made of spiral wound fish paper and is electrical grade paper according to ASTM Spec No. D 710. It is a 105° C. (Class A) material (see ASTM spec. no. D 710 X1.8.1). The polyester resin has a deformation temperature of 113° C. and a viscosity between 1100 and 1400 cps. Fuse 10 is a ⅜" size fuse, and fuse casing 12 has an inner diameter of 0.250", an outer diameter of 0.370", an inner tube 22 thickness of 0.030", and an outer layer 20 thickness of 0.030". Inner ends 28 and 30 of ferrules 14 and 16 are crimped onto the outer surface of fuse casing 22.

Fusible element assembly 18 includes seat 32 (FIG. 3), which sits in recess 34 of ferrule 16 and carries plunger 36. One end of plunger 36 is biased outward by spring 38, and the other end of plunger 36 has hole 40 in which an end of wire 42 and an end of wire 44 are secured by solder 46 (FIG. 4). The other end of wire 42 is soldered between seat 32 and ferrule 16 (solder not shown in FIG. 1), and the other end of wire 44 is held in solder 47 in trough 48. Electrical wire 50 extends from the other end of trough 48 and passes through slot 52 in slug 54 and is soldered thereto (solder not shown in FIG. 1).

Referring to FIG. 5, in the manufacture of fuse casing 12, six-foot lengths of inner paper tube 22 are spliced together by internal wooden pegs 56 and fed through braiding apparatus 58 to tube guide 60, which properly aligns the tube in the center of resin applicator 62. Resin applicator 62 applies resin to yarns 24 and 26 as they travel from braiding machine 58 to the outer surface of tube 22 just prior to the yarns being braided onto tube 22 just downstream of resin applicator 62. Braiding machine 58 is a standard textile braider (e.g., as described in U.S. Pat. No. 3,007,497) that provides sixteen warp yarns 24 from stationary spools 61 on warp yarn stage 63 and thirty-two fill yarns 26 from moving spools 66 on fill yarn stage 68. Warp yarns 24 pass from spools 61 through the center of the fill yarn stage 68. Spools 66 for fill yarns 26 travel in circumferential undulating paths of two tracks of fill yarnstage 68 at 25 rpm. As warp yarns 24 and fill yarns 26 pass through resin applicator 62, they rub along an inner cylindrical surface to which a continuous ring of polyester resin is provided by pumping into inlet 70. The yarns passing through resin applicator 62 are impregnated and coated with more resin than is needed in the outer layer 20 of the final product in order to avoid voids. Downstream of applicator 62 the yarns converge onto and form a tubular braid on the outside of paper tube 22. The warp threads prevent the fill yarns from tending to tighten around inner tube 22 as they are subjected to tension owing to the "Chinese fingers" effect. Because the yarns have very little twist, they essentially take the shape of whatever they lay against, and the voids between them are generally small. In any event, the yarns are impregnated, and all voids are filled with resin. The resulting tube and coated/impregnated polyester/fiberglass yarnbraid structure then passes through chrome plated wiper bushing 72, which wipes off excess resin before the structure passes into heated die 74 (heated between 300° and 350° F.). The inner diameter of heated die 74 is slightly more than the outer diameter of inner tube 22 plus twice the thickness of yarn 26; the inner diameter of wiper bushing 72 is 0.010" larger than the inner diameter of the heating die 74. The polyester resin, which is a thermoset, hardens in passing through heated die 74, shrinking slightly in size (up to a few thousandths of an inch). The resulting composite tube passes from heated die 74 through fan 76 and to tractor wheels 78, which are used to advance the entire inner tube and outer layer being formed thereon through the apparatus at 1.5 fpm. In the manufacture of casing 22, by avoiding the relative travel of the braided material over a mandrel, there is less friction and damage to the yarns than there would be if a stationary mandrel were used. The resulting fuse casing 12 is sufficiently resilient so as to deform without damage when it is constricted by crimping of ferrules 14 and 16.

In addition to the spring-type fuse shown in FIGS. 1–4, the composite tube fuse casings according to the invention can be used in the types of fuses described in Knapp, Jr. et al. U.S. Pat. No. 4,344,058 and Belcher U.S. Pat. No. 3,701,069, which patents are hereby incorporated by reference. A fuse casing for a ½" size fuse of the type shown in the U.S. Pat. No. 4,344,058 has an inner diameter of 0.375"; an outer diameter of 0.500"; an inner tube 22 thickness of 0.030", and an outer layer 20 thickness of 0.032". A fuse casing for a ¾" size fuse of the type described in the U.S. Pat. No. 3,701,069 has an inner diameter of 0.625", an outer diameter of 0.750", an inner tube 22 thickness of 0.030"; and an outer layer 20 thickness of 0.032".

In the resulting electrical fuse 10, the use of the paper tube 22 provides needed bulk to the casing at low cost and also provides good heat retention properties, causing the fusible element to fuse quickly (owing to the retention of heat). Moreover, the better heat retention of the fuse casing provided by the inner paper tube permits the use of a fusible element that provides better electrical conductivity and thus less watts loss during normal operation. The heat retention properties of the inner paper tube are predictable, permitting accurate predictions of the times at which the fuses blow and reliable ratings for the fuses. The location of the paper tube inside of the outer layer acts to insulate the resin of the outer layer 20 from heat that might otherwise deleteriously affect the resin, particularly during arcing of the fuse element.

The use of a paper inner tube also permits one to increase the thickness of the composite fuse casing without increasing the thickness of the braided layer, which would require the use of thicker yarns as the thickness of the braided layer is, in general, equal to twice the thickness of the yarn. Increasing the thickness of the yarns would in turn tend to complicate the processing, as thicker yarns are more difficult to braid, and to increase cost.

The braided yarn and resin of outer layer 20 provide hoop strength and axial strength, resisting radial and axial forces during blowing of the fuse. Inner layer 22 also acts to contain gases during blowing of a fuse, something which is particularly important in applications where the fuse is contained in an enclosure which would otherwise contain the gases and permit a conductive path outside of the fuse casing between the ferrules.

OTHER EMBODIMENTS

Other embodiments of the invention are within the scope of the following claims In addition to braiding, other methods of uniformly providing reinforcing yarns around a preformed inner tube can be employed, e.g., filament winding or continuous winding in which heads move and wrap around the tube. In addition to the fiberglass yarns, Kevlar or graphite yarns can be used. In addition to the polyester resin, an epoxy resin, melamine resin, or phenolic resin can be used to impregnate and coat the yarns. Where desired, one or more additional layers can be added to the composite tube; e.g., an additional layer of yarns and resin can be braided over the first. If one were to overbraid a second layer on top of layer 20, it would permit adjusting the angles at which the fill yarns lay down; for example, the first layer could be at 45°, and the second layer could be at 30° in order to vary the strength provided by each layer, one layer providing more hoop strength and the other layer providing a greater longitudinal strength if so desired.

In addition to the fish paper tube, the tube could also be of kraft paper or paper loaded with melamine or other resins. When melamine material is in the inner tube, its liberation of nitrogen when exposed to heat desirably provides arc extinction properties.

In addition to the circular section for the fuse casing 12, rectangular cross sections or other cross sections of other shapes can also be used. Inner tube 22 could also be formed in place just prior to passing through the braiding apparatus, or it could be made of extruded plastic.

What is claimed is:
1. An electrical fuse comprising
   a fuse casing including a preformed inner structural tube and an outer layer formed in place thereon,
   a pair of terminals at the ends of said fuse casing, and a fusible element inside said casing and connected to said terminals, wherein said outer layer includes reinforcing fibers around said inner tube and resin bonding said fibers together, wherein said reinforcing fibers are multiple-filament reinforcing yarns that have been braided in a tubular shape around said inner tube, and said resin impregnates said yarns, said tubular shape having a hollow portion, said inner tube being within said hollow portion of said tubular shape.

2. The fuse of claim 11 wherein said preformed inner tube provides thermal barrier properties.

3. The fuse of claim 1 wherein said inner tube is made of paper.

4. The fuse of claim 1 wherein said inner tube is made of glass melamine.

5. The fuse of claims 1 wherein said braided yarns include longitudinally oriented warp yarns and laterally oriented fill yarns.

6. The fuse of claim 1 wherein said resin is a thermoset resin.

7. The fuse of claim 1 wherein said resin comprises epoxy resin.

8. The fuse of claim 1 wherein said resin comprises polyester.

9. The fuse of claim 1 wherein said casing has a circular cross section.

10. The fuse of claim 1 wherein said casing has a generally square cross section.

11. The fuse of claim 1 wherein said yarns are twisted filament yarn.

12. The fuse of claim 11 wherein said yarns comprise fiberglass.

13. The fuse of claim 11 wherein said yarns comprise Kevlar.

14. The fuse of claim 11 wherein said yarns comprise graphite.

15. The fuse of claim 1 wherein said braided yarns include longitudinally oriented warp yarns and laterally oriented fill yarns, and said fill yarns are bigger than said warp yarns.

16. The fuse of claim 15 wherein said fill yarns are more than four times larger than said warp yarns.

17. The fuse of claim 16 wherein said fill yarns are eight to ten times larger than said warp yarns.

18. The fuse of claim 17 wherein said fill yarns are ECG 37 1/0-0.7 TPI 4 ends, and said warp yarns are ECG 75 1/0 0.7 TPI.

19. The fuse of claim 15 wherein there are less said warp yarns than there are said fill yarns.

20. A method of making a fuse comprising
providing a preformed inner tube,
forming an outer layer thereon,
placing a fusible element inside said inner tube, and
electrically connecting terminals to said fusible element and securing them to respective ends of said tube,
wherein said forming includes providing reinforcing fibers around said inner tube and bonding said fibers together with resin,
wherein said reinforcing fibers are multiple-filament reinforcing yarns, and said forming includes braiding said yarns in a tubular shape around said inner tube, and impregnating said yarns with said resin, said tubular shape having a hollow portion, said inner tube being within said hollow portion.

21. The method of claim 20 wherein said resin is applied to said yarns prior to braiding of them on said inner tube.

22. The method of claim 21 wherein said braided yarns include longitudinally oriented warp yarns and laterally oriented fill yarns.

23. The method of claim 20 wherein said resin is a thermoset resin, and said forming includes passing said tube and yarns and resin through a heated die.

24. The fuse of claim 1 wherein said resin comprises phenolic resin.

25. The fuse of claim 1 wherein said resin comprises melamine resin.

26. The fuse of claim 1 wherein said casing has a generally rectangular cross section.

27. The fuse of claim 17 wherein there are at least 16 warp yarns and at least 32 fill yarns.

* * * * *